(12) United States Patent
Smilg et al.

(10) Patent No.: US 8,327,117 B2
(45) Date of Patent: Dec. 4, 2012

(54) RECONFIGURABLE FADEC WITH FLASH BASED FPGA CONTROL CHANNEL AND ASIC SENSOR SIGNAL PROCESSOR FOR AIRCRAFT ENGINE CONTROL

(75) Inventors: Lawrence Mitchell Smilg, Carmel, IN (US); James Ernst, Carmel, IN (US); Robert Zeller, Noblesville, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 0 days.

(21) Appl. No.: 12/201,129

(22) Filed: Aug. 29, 2008

(65) Prior Publication Data

US 2010/0057957 A1 Mar. 4, 2010

(51) Int. Cl.
*G06F 13/00* (2006.01)
(52) U.S. Cl. ............. 712/36; 701/100; 710/104; 712/37
(58) Field of Classification Search .................. None
See application file for complete search history.

(56) References Cited

U.S. PATENT DOCUMENTS

| | | | |
|---|---|---|---|
| 4,604,699 A * | 8/1986 | Borcherdt et al. .............. 702/15 |
| 4,682,577 A * | 7/1987 | Kato et al. ............... 123/406.46 |
| 4,889,132 A * | 12/1989 | Hutcheson et al. ........... 600/493 |
| 5,444,637 A * | 8/1995 | Smesny et al. ................. 702/127 |
| 5,623,411 A | 4/1997 | Morvan |
| 5,775,089 A | 7/1998 | Skarvan |
| 5,775,090 A | 7/1998 | Skarvan |
| 6,195,247 B1 | 2/2001 | Cote et al. |
| 6,362,768 B1 | 3/2002 | Younis et al. |
| 6,434,473 B1 * | 8/2002 | Hattori .......................... 701/100 |
| 6,448,914 B1 | 9/2002 | Younis et al. |
| 7,024,660 B2 * | 4/2006 | Andrade et al. .............. 717/124 |
| 7,030,649 B1 * | 4/2006 | Balasubramanian et al. .. 326/38 |
| 7,031,854 B2 * | 4/2006 | Lin et al. .......................... 702/60 |
| 7,191,087 B2 * | 3/2007 | Inoue et al. .................... 702/127 |
| 7,209,066 B1 * | 4/2007 | Trumbo ........................ 341/155 |
| 7,768,811 B1 * | 8/2010 | Dhaoui et al. .................. 326/113 |
| 2006/0212679 A1 * | 9/2006 | Alfano et al. ..................... 712/38 |
| 2009/0312892 A1 * | 12/2009 | Mahoney et al. .................. 701/3 |

OTHER PUBLICATIONS

The Jet Engine—control systems, Components of a Control System, The Jet Engine, 6th edition 2005, section 2.6, pp. 190-203, ISBN: 0 902121 2 35, Rolls-Royce PLC, London, England.
Navanee Sundaramoorthy, Embedded Systems Design "Put a configurable 32-bit processor in your FPGA", May 2007, 8 pages.
Russell L. Roan, et al., Embedded Technology Journal "Optimizing Architectures for Performance and Area using Virtual System Prototypes", Techfocus Media, Inc., Nov. 7, 2006, 11 pages.
Kevin Morris, Embedded Technology Journal "Cranking up the MIPS, Introducing the 74K", Techfocus Media, Inc., May 22, 2007, 4 pages.
Kevin Morris, Embedded Technology Journal "ARM Optimizes for FPGA, ARM/Actel Announce Cortex-M1", Techfocus Media, Inc., Mar. 20, 2007, 3 pages.

(Continued)

*Primary Examiner* — Kenneth Kim
(74) *Attorney, Agent, or Firm* — McCormick, Paulding & Huber LLP

(57) ABSTRACT

A reconfigurable FADEC includes a reconfigurable CPU configured for performing digital computing functions. A reconfigurable MSPD communicates with the CPU and is configured for performing analog I/O functions. A data bus is coupled to the CPU and the MSPD. The data bus is configured for connecting the CPU and the MSPD to an external connector.

12 Claims, 3 Drawing Sheets

OTHER PUBLICATIONS

Kevin Morris, FPGA and Structured ASIC Journal "FP?A, The Quest for the Best Building Blocks", Techfocus Media, Inc., Jul. 24, 2007, 4 pages.

Navneet Rao, FPGA and Structured ASIC Journal "FPGAs and Ethernet, Providing Programmability to Pervasive Interconnect Standard", Techfocus Media, Inc., Jul. 10, 2007, 8 pages.

* cited by examiner

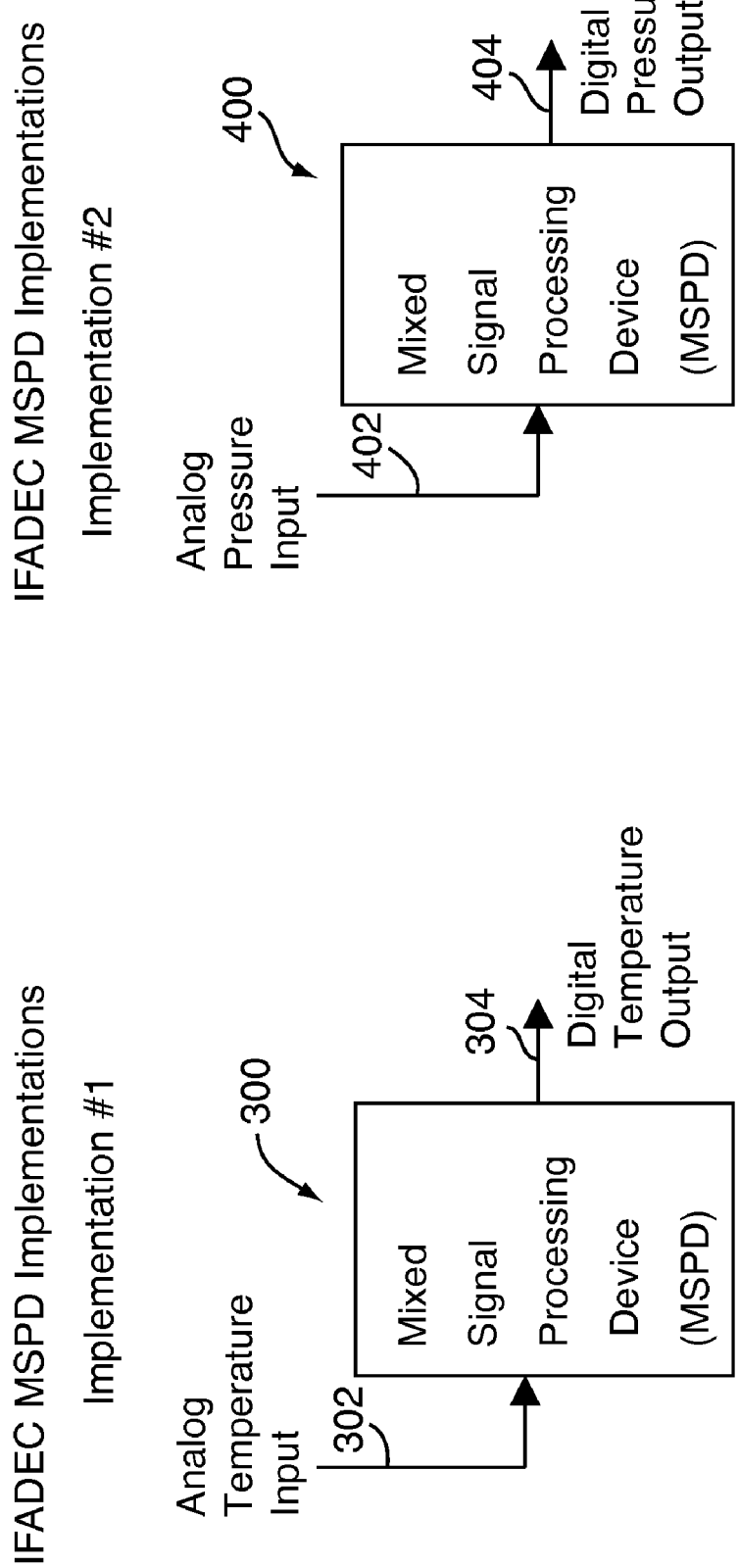

RECONFIGURABLE FADEC WITH FLASH BASED FPGA CONTROL CHANNEL AND ASIC SENSOR SIGNAL PROCESSOR FOR AIRCRAFT ENGINE CONTROL

FIELD OF THE INVENTION

The present invention is directed generally to FADECs, and more particularly to FADECs that are reconfigurable to work on generally all types of gas turbine engines.

BACKGROUND OF THE INVENTION

A conventional full authority digital electronic control (FADEC) for a gas turbine engine is typically limited in application to the specific engine for which the FADEC is designed. This limitation leads to the repeated expense in designing, manufacturing and testing FADECs each time a new type of gas turbine engine is released.

There is a continuing need for technology development relating to developing more cost effective and reconfigurable FADECs that can be implemented on generally any new type of gas turbine engine. The present invention satisfies this need in a novel and nonobvious way.

SUMMARY OF THE INVENTION

In an aspect of the present invention, a reconfigurable FADEC includes a reconfigurable device configured for performing digital computing functions (CPU). A reconfigurable Mixed-Signal Programmable Device (MSPD) communicates with the reconfigurable CPU and is configured for performing analog I/O functions. A data bus is coupled to the reconfigurable CPU and the MSPD. The data bus is configured for connecting the reconfigurable CPU and the MSPD to an external connector.

BRIEF DESCRIPTION OF THE DRAWINGS

FIG. 4A schematically illustrates an MSPD implementation in accordance with the present invention.

FIG. 4B schematically illustrates another MSPD implementation in accordance with the present invention.

DETAILED DESCRIPTION OF THE PREFERRED EMBODIMENTS

Figure 1:
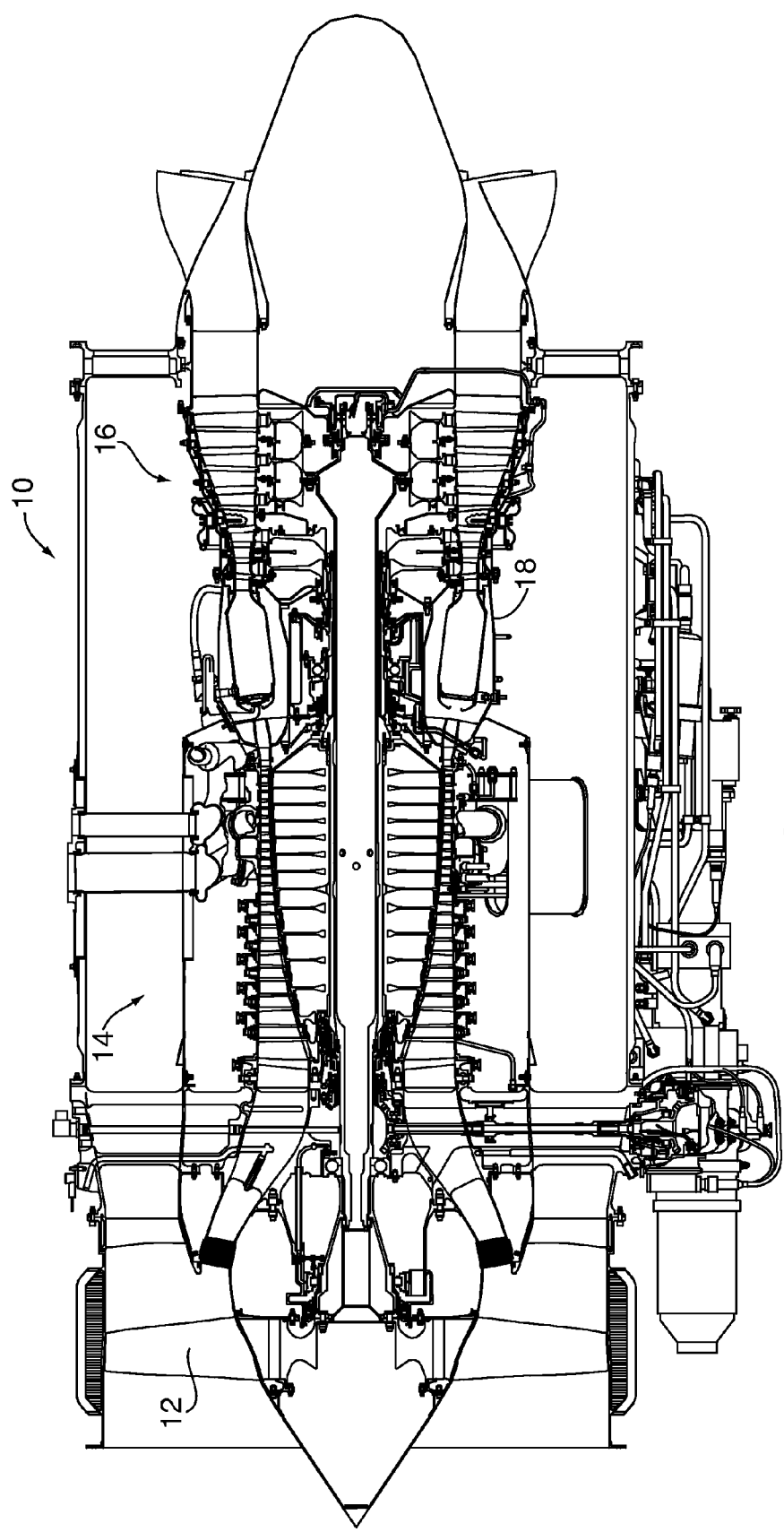
FIG. 1 is a cross-sectional view of a gas turbine engine incorporating a reconfigurable FADEC in accordance with the present invention.

FIG. 1 is a cross-sectional view of a gas turbine engine 10 illustrating, by way of example only, a context for implementing a reconfigurable Full Authority Digital Engine Control (FADEC) for a gas turbine engine in accordance with the present invention. The gas turbine engine 10 includes, among other things, a fan rotor 12, compressor section 14, turbine section 16 and an engine casing 18. Although a reconfigurable FADEC will be explained in the context of a gas turbine engine, it should be understood that such FADECs can be implemented in other engine applications without departing from the scope of the present invention.

Figure 2:
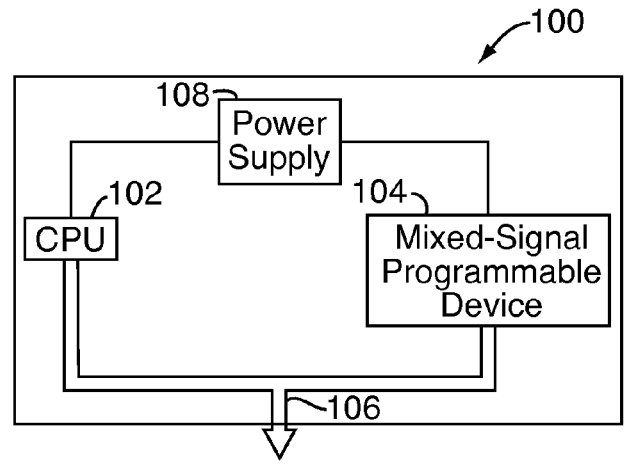
FIG. 2 schematically illustrates a reconfigurable FADEC embodying the present invention.

With reference to FIG. 2, a reconfigurable FADEC embodying the present invention is indicated generally by the reference number 100. The reconfigurable FADEC 100 includes a reconfigurable CPU 102 configured for performing digital computing functions. A reconfigurable MSPD 104 communicates with the reconfigurable CPU 102 and is configured for performing analog I/O functions. A data bus 106 is coupled to the reconfigurable CPU 102 and to the MSPD 104.

Preferably, the reconfigurable CPU 102 and the reconfigurable MSPD 104 are each programmably reloadable. The reconfigurable CPU 102 is configured to perform data packing for data bus communications and signal filtering. The reconfigurable MSPD 104 can be, for example, an application-specific integrated circuit (ASIC) or another reconfigurable device. Moreover, the reconfigurable MSPD 104 is designed for sensor signal conditioning, excitation, actuator drives, fault detection, and data bus interfacing.

The data bus 106 is configured for connecting the reconfigurable CPU 102 and the MSPD 104 to an external connector (not shown). The data bus 106 is designed to isolate interactions between the reconfigurable CPU 102 and the reconfigurable MSPD 104 for fault isolation. Moreover, the data bus 106 has a communications standard compatible with an external PC for performing tests thereon. The data bus 106 is also configured to carry information between sensing MSPDs and control channel CPUs. The data bus 106 is an external data bus and allows additional devices to be connected thereto as an upgrading feature. The additional devices include, for example, sensor I/O, computing, and data storage for engine monitoring. Further, the data bus 106 conforms to a data bus standard such as, for example, IEEE1394, CANbus, USB, AFDX, or RS-485.

The reconfigurable FADEC 100 preferably further includes a scaleable power supply 108 configured to select between aircraft and PMA power. Moreover, the power supply 108 can condition PMA power to DC, as well as adjust DC power level to distribute the necessary operating voltage(s).

The reconfigurable FADEC 100 employs recent advances in programmable logic and programmable analog circuits in order to create a single hardware platform that is capable of controlling any currently conceived gas turbine engine.

Elements of the reconfigurable FADEC 100 are: one or more reconfigurable CPUs 102 to perform digital computing functions, one or more MSPDs 104 (ASIC or FPGA) to perform analog I/O, and a data bus 106 connecting each of the reconfigurable elements to an external connector. The combination of these elements creates a platform that can be developed once, and reprogrammed for use on multiple applications. Device configurations can also be reused on multiple applications.

The reconfigurable FADEC 100 is an improvement in the area of gas turbine engine control computers. These devices are used by Rolls-Royce on most of its engine lines, and are generally known as EECs (Engine Electronic Controller), ECUs (Engine Control Unit), or PCMUs (Propulsion Control and Monitoring Unit).

The reconfigurable CPU 102 is used instead of a control channel in a conventional FADEC. It is based on an FPGA such as or similar to, for example, the Actel ProASIC3 manufactured by Actel Corporation, with commercial IP included for a CPU (ARM as an example), data bus interface, and any other special purpose logic as desired for the specific application.

The reconfigurable MSPD 104 (ASIC/FPGA) is configured for sensor signal conditioning, excitation, actuator drives, fault detection, and data bus interface. The reconfigurable MSPD 104 can be implemented in a mixed signal programmable device such as, for example, the Actel Fusion Programmable System Chip manufactured by Actel Corporation, or can be implemented via a custom hybrid ASIC, as shown in U.S. Pat. No. 6,362,768, the disclosure of which is hereby incorporated by reference in its entirety.

The data bus 106 is configured to carry traffic between the various sensing MSPDs and the control channel CPUs. The data bus 106 is also routed outside a box or housing (not shown) of the reconfigurable FADEC 100 to allow for other devices to be connected thereto such as, for example, engine monitoring systems, aircraft data, ground support computers, reprogramming devices, or additional reconfigurable FADECs. As mentioned above, the data bus 106 is configured to be implemented on one of many commercial data bus standards such as, for example, IEEE 1394, CAN-bus, USB, AFDX, TTP, FireWire, FlexRay, but a true multi-drop bus such as an RS-485 bus has wiring advantages over a bus that is designed as hub-and-spoke such as USB or AFDX.

The power supply 108 is preferably a redundant supply and functions similarly to current EEC power supplies, using electronic components to select between aircraft and PMA power, to condition the PMA power to DC, and to adjust the DC power level to distribute the necessary operating voltages to the other internal components, sensors, and actuators.

Preferably, the reconfigurable FADEC 100 in accordance with the present invention physically resembles a conventional FADEC—a box with a series of connectors. Internally, the box houses one or more circuit boards with the above-described components.

Figure 3:
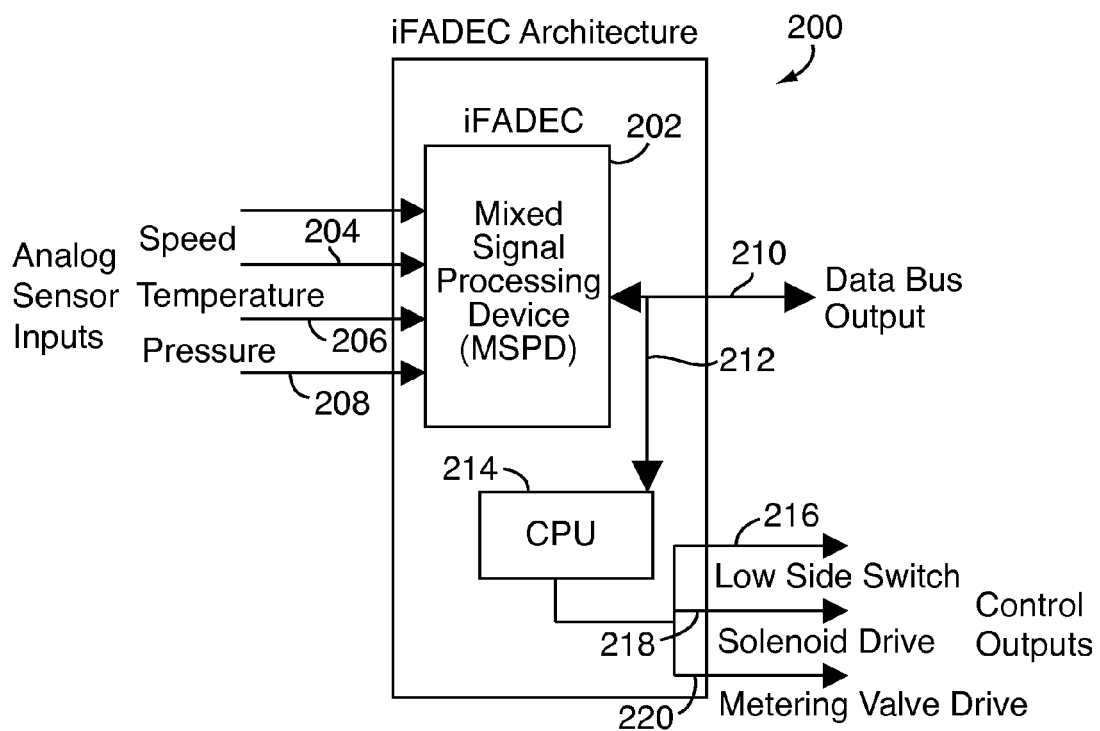
FIG. 3 schematically illustrates a reconfigurable FADEC input and output configuration embodying the present invention.

FIG. 3 schematically illustrates an input and output configuration of a reconfigurable FADEC embodying the present invention. A reconfigurable FADEC 200 includes an MSPD 202 having a plurality of inputs for sending to the MSPD operational information from throughout a gas turbine engine. As shown in FIG. 3, for example, inputs 204, 206 and 208 are respectively configured for sending speed, temperature and pressure information to the MSPD 202. The MSPD 202 is configured for bidirectional communication via line 210 with an external data bus, and configured for bidirectional communication via line 212 with a reconfigurable CPU 214. The reconfigurable CPU 214 has a plurality of control outputs including, for example, a first output 216 configured for communicating with a low side switch, a second output 218 configured for communicating with a solenoid drive, and a third output 220 configured for communicating with a metering valve drive.

FIG. 4A schematically illustrates an MSPD implementation in accordance with the present invention. As shown in FIG. 4A, an MSPD 300 includes an input 302 configured for transmitting analog temperature information to the MSPD for processing. The MSPD 300 further includes an output 304 configured for transmitting to an external data bus digital temperature information derived from the analog temperature information processed by the MSPD.

FIG. 4B schematically illustrates another MSPD implementation in accordance with the present invention. As shown in FIG. 4B, an MSPD 400 includes an input 402 configured for transmitting analog pressure information to the MSPD for processing. The MSPD 400 further includes an output 404 configured for transmitting to an external data bus digital pressure information derived from the analog pressure information processed by the MSPD.

A reconfigurable FADEC in accordance with the present invention offers several advantages including:

1) Reduced non-recurring expense/engineering (NRE) when applied across multiple engines (reusability): once the hardware is assembled and qualified, it can be reused as is, with a common h/w part number across multiple engines. The only difference is in the CPU firmware configurations. This concept is often called "product lines".
2) Ease of test: the components of the reconfigurable FADEC can be specified and tested in isolation, as the data bus serves to isolate interactions between the components. This concept is often known as "verification partitioning".
3) Fault isolation: the result of the components communicating with each other via the data bus allows fault isolation because the component that did not communicate properly over the data bus is the one that is failed.
4) Overhead required for test: because the components can be isolated, a real time test can be performed by connecting the components to a PC that supports the communications standard, rather than a complex and expensive real-time rig.
5) Reduced cost of obsolescence: if one of the reconfigurable components within the FADEC becomes obsolete, the design can be transferred to a newer reconfigurable component with equivalent or greater capability, and the only significant risk remaining is the physical environmental retest.
6) Ease of rework during development: errors requiring rework of the circuitry can be corrected by reloading the programmable logic devices, instead of requiring circuits and boards to be physically reworked.
7) High performance: processors available today to be embedded within FPGAs typically are of higher speed than those currently in use in systems for controlling gas turbine engines. In addition, certain functions may be performed in the embedded hardware device instead of in software, which further reduces the CPU load. Examples of this include data packing for data bus communications and signal filtering.
8) Reduced part count: programmable devices combine multiple discrete components, thus reducing the parts count, reducing cost, and increasing reliability. Using a lifetime buy obsolescence strategy is more feasible with fewer components.
9) Expandability: the external data bus allows additional devices to be added at any point in the control system life cycle. These external devices can include additional sensor I/O, additional computing, or additional data storage for engine monitoring.
10) Scalability: the reconfigurable FADEC can be scaled to comprise additional computing power, additional I/O, or a varying power supply as needed for a particular application.

As will be recognized by those of ordinary skill in the pertinent art, numerous modifications and substitutions can be made to the above-described embodiments of the present invention without departing from the scope of the invention. Accordingly, the preceding portion of this specification is to be taken in an illustrative, as opposed to a limiting sense.

What is claimed is:

1. A reconfigurable FADEC comprising:
a first programmable device configured as a FADEC control channel for receiving digital sensor information, performing digital computing functions, and producing control outputs responsive to at least the digital sensor information;
a second programmable device receiving analog sensor signals, communicating digital sensor information to the first programmable device, and configured as a mixed-signal processing device for performing analog I/O functions; and a data bus coupled in communication with the first programmable device, the second programmable device, and an external connector, wherein the first programmable device consists essentially of a non-volatile flash-based FPGA, the second programmable device is one of an ASIC and an FPGA.

2. A reconfigurable FADEC as defined in claim 1, wherein the second programmable device is configured for sensor signal conditioning, excitation, actuator drives, fault detection, and data bus interfacing.

3. A reconfigurable FADEC as defined in claim 1, wherein the data bus is configured to isolate interactions between the first programmable device and the second programmable device for fault isolation.

4. A reconfigurable FADEC as defined in claim 1, wherein the data bus is configured to have a communications standard compatible with an external PC for performing tests thereon.

5. A reconfigurable FADEC as defined in claim 1, wherein the data bus is configured to a data bus standard selected from one of IEEE 1394, CAN-bus, USB, AFDX, TTP, FireWire, FlexRay, and RS-485.

6. A reconfigurable FADEC as defined in claim 1, wherein the first programmable device and the second programmable device are each configured to be reprogrammable through the data bus.

7. A reconfigurable FADEC as defined in claim 1, wherein the first programmable device is configured to perform data packing for data bus communications and signal filtering.

8. A reconfigurable FADEC as defined in claim 1, wherein the data bus is an external data bus and is configured to allow additional devices to be connected thereto as an upgrading feature.

9. A reconfigurable FADEC as defined in claim 8, wherein the additional devices include sensor I/O, computing, and data storage for engine monitoring.

10. A reconfigurable FADEC as defined in claim 1, further comprising a power supply configured to select between aircraft and PMA power.

11. A reconfigurable FADEC as defined in claim 1, further comprising a power supply configured to condition PMA power to the voltage necessary to power the FADEC.

12. A reconfigurable FADEC as defined in claim 1, further comprising a scaleable power supply configured to adjust DC power level to distribute the necessary power to operate the FADEC so as to allow the ability to scale the power supply as the functions of the FADEC scale.

* * * * *